United States Patent [19]

Halkerston et al.

[11] 4,410,387
[45] Oct. 18, 1983

[54] BALL SEALERS AND METHOD OF PREPARATION

[75] Inventors: Russell J. Halkerston; Jay E. Meili, both of Milwaukee, Wis.

[73] Assignee: Molded Dimensions Inc., Port Washington, Wis.

[21] Appl. No.: 125,204

[22] Filed: Feb. 27, 1980

[51] Int. Cl.³ .......................... B28B 9/00; B29F 1/10; B29H 9/11
[52] U.S. Cl. .................................. 156/245; 264/250; 264/263; 264/271.1; 264/275; 264/279
[58] Field of Search ................ 166/284, 193; 428/407; 156/245; 264/250, 263, 271.1, 275, 279

[56] References Cited

U.S. PATENT DOCUMENTS

| 2,754,910 | 7/1956 | Derrick et al. | 166/284 |
|---|---|---|---|
| 3,010,514 | 11/1961 | Fox | 166/284 |
| 3,270,108 | 8/1966 | Randolf | 264/250 |
| 3,364,607 | 1/1968 | Twickler | 264/250 |
| 3,437,147 | 4/1969 | Davies | 166/284 |
| 3,547,197 | 12/1970 | Chevalier et al. | 166/284 |
| 3,989,568 | 11/1976 | Isaac | 264/279.1 |
| 4,102,401 | 7/1978 | Erbstoesser | 166/284 |

FOREIGN PATENT DOCUMENTS

| 56-111656 | 9/1981 | Japan | 264/279.1 |
|---|---|---|---|
| 2025485 | 1/1980 | United Kingdom | 166/28 |

*Primary Examiner*—James C. Cannon
*Attorney, Agent, or Firm*—Quarles & Brady

[57] ABSTRACT

A ball sealer consists of an inner spherical rigid core of a desired density and an outer resilient or compliant continuous layer of uniform thickness which is comprised of a pair of hemispheric caps positioned about and secured to the core and to each other.

The ball sealer is formed by molding a first cap in the form of a hemisphere having a central cavity adapted to receive one-half of an inner core. The cap is placed in a cavity in the bottom plate of a mold and the outer surface of an inner core or the inside of the cavity of the cap is coated with an adhesive that will bind the cap to the core. The core is then placed within the cavity of the cap. A cavity plate having a hemispheric cavity is then positioned on top of the bottom plate of the mold with exposed upper half of the inner core received within the cavity of the cavity plate. The second cap is then molded in situ about the inner core and bonded to the first cap and the inner core to form a continuous outer layer of resilient and compliant material encapsulating the inner core.

5 Claims, 4 Drawing Figures

U.S. Patent  Oct. 18, 1983  4,410,387
FIG.1
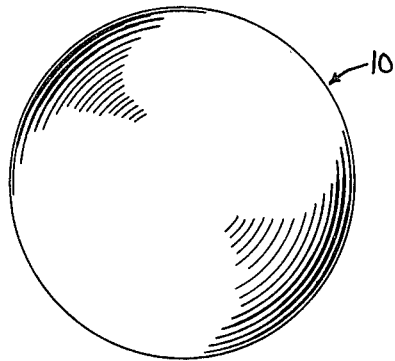
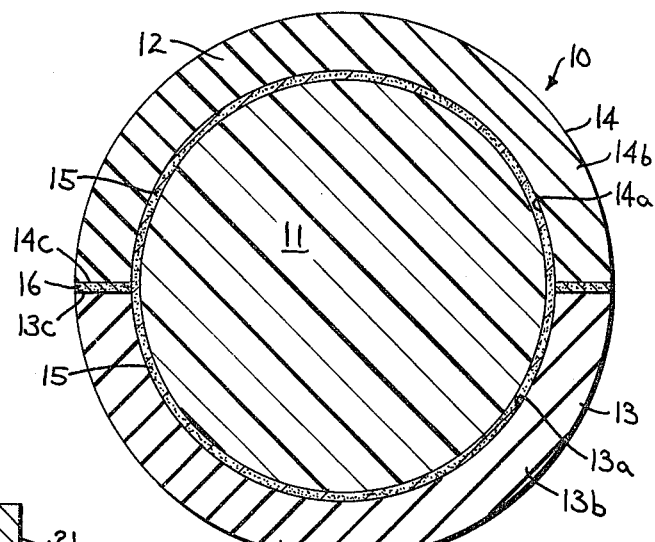
FIG.2
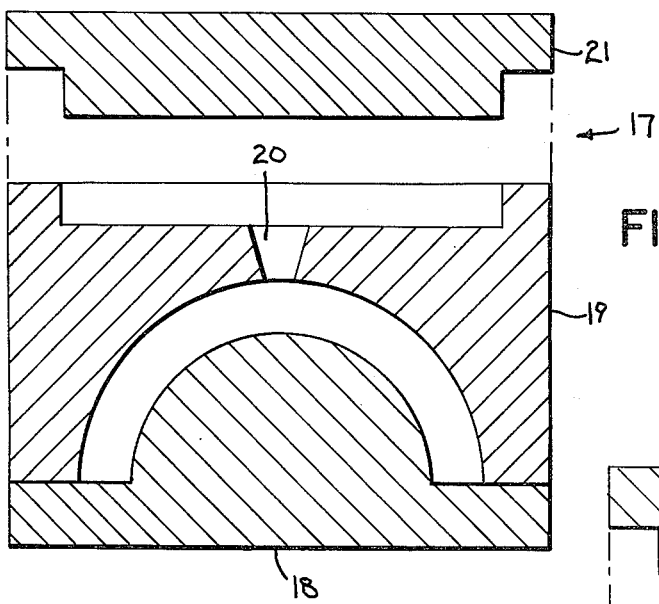
FIG.3
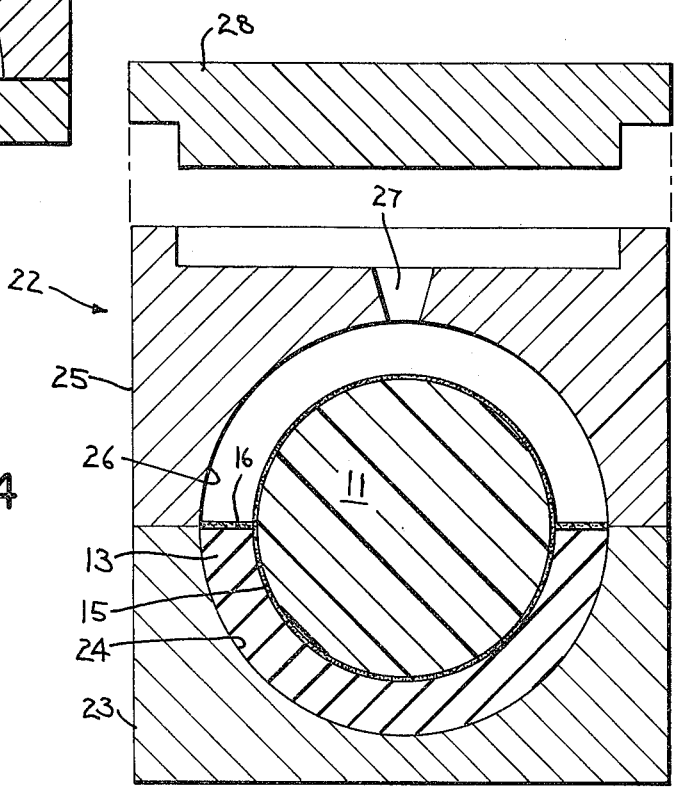
FIG.4

BALL SEALERS AND METHOD OF PREPARATION

The present invention relates to ball sealers. More particularly, it relates to ball sealers which can be used as diverting agents in the treatment of wells having a perforated casing and to a method of preparing such ball sealers.

BACKGROUND OF THE INVENTION

Ball sealers are small spheres having a resilient or compliant outer layer which are used in the oil and gas industry in connection with efforts to increase the production rate of wells through acid treatment or hydraulic fracturing.

Generally when ball sealers are used, an initial charge of treating fluid is first injected into the well. Then a number of ball sealers, which is less than the calculated total number of perforations in the casing of the well, is placed in the well. Next, additional treating fluid is injected under pressure and the ball sealers are carried by the flow of the fluid to those perforations in the well casing which are in the area of least resistance to flow. The ball sealers seat upon those perforations and divert the flow of the treating fluid to the remaining open perforations. The ball sealers are retained seated upon the perforations by the pressure differential of the treating fluid across the perforations. when the injection of treating fluid under pressure stops, the pressure differential across the perforations drops and the ball sealers become unseated.

The use of the ball sealers which divert the treating fluid from the area of least resistance to flow makes it possible for the treating fluid to reach areas of higher resistance which are normally untreated. The usual result is an increased production rate of hydrocarbons from the well.

In the Erbstoesser U.S. Pat. No. 4,102,401, a ball sealer is disclosed which has a syntactic foam inner core and an outer resilient layer of rubber or a similar elastomeric material. The Erbstoesser ball sealers are prepared by compressing an uncured rubber cover about a spherical inner core of syntactic foam in an arbor press and curing the rubber. Ball sealers prepared in this manner do not always have an outer layer of uniform and predictable thickness which is considered to be essential to insure good performance.

The ball sealer of the Erbstoesser patent has a density which is less than that of the treating fluid with which it is used. However, in the past, ball sealers have also been used which have a density which is higher than that of the treating fluids. The use of the low density sealers appears to be the more promising.

In order to be effective, ball sealers of either high or low density must have outer coatings or coverings which are sufficiently resilient or compliant to seat upon and to seal the jet formed perforations in the well casing. They must also have rigid inner cores which resist extrusion into or through the perforation. Otherwise, the ball sealers could penetrate into the pay zone and permanently damage the flow characteristics of the well. In addition, the ball sealers must be chemically inert in the environment in which they are used and resist the stresses caused by the hydrostatic pressure of the fluid in the well bore and the pumping pressures.

SUMMARY OF THE INVENTION

It is the primary object of the present invention to disclose a novel ball sealer having a spherical inner core and an outer resilient or compliant layer of uniform thickness.

It is a further object of the invention to disclose a method of preparing such ball sealers.

The ball sealer of the present invention consists of an inner spherical rigid core of the desired density and an outer resilient or compliant continuous layer of uniform thickness which is comprised of a pair of hemispheric caps positioned about and secured to the core.

In the preferred method of the present invention, a first cap is molded in the form of a hemisphere having a central cavity adapted to receive one-half of an inner core. The cap is placed in a cavity in the bottom plate of a mold and the outer surface of an inner core and/or the inside of the cavity of the cap is coated with an adhesive that will bind the cap to the core. The core is then placed within the cavity of the cap. A plate having a hemispheric cavity is then positioned on top of the bottom plate of the mold with exposed upper half of the inner core received within the cavity of the plate. The second cap is then molded in situ about the inner core and bonded to the first cap and inner core to form a continuous outer layer of resilient and compliant material encapsulating the inner core. The resulting outer layer is of uniform thickness with no gaps or voids.

BRIEF DESCRIPTION OF THE DRAWINGS

The preferred embodiment of the invention will now be described in connection with the enclosed drawings.

FIG. 1 is a perspective view of a ball sealer of the present invention;

FIG. 2 is a cross-sectional view of the ball sealer of FIG. 1 taken along lines 2—2 of FIG. 1;

FIG. 3 is a cross-sectional view of a single cavity of a transfer mold for making caps;

FIG. 4 is a cross-sectional view of a single cavity of a second mold for completing the encapsulation of the inner core and forming the ball sealer.

DESCRIPTION OF THE PREFERRED EMBODIMENT

As seen in FIGS. 1 and 2 of the drawings, the ball sealer 10 has a spherical inner core 11 surrounded by a layer 12 of a uniform thickness of resilient or compliant elastomeric material. The preferred inner core is a syntactic form of the type described in U.S. Pat. No. 4,102,401. However, polymethylpentene, polyurethane foam and other plastics can be used if they have desired strength, density and other properties. The preferred elastomeric material of the outer layer is either a nitrile rubber having a durometer of about 40 to about 95 on a Shore A scale or a polyurethane having a similar durometer. Other elastomers, including polychloroprene, polyacrylates, fluoro elastomers and epichlorohydrin rubber can also be employed.

Referring specifically to FIG. 2, it can be seen that the outer layer 12 is comprised of two caps, 13 and 14 having a central cavity, 13a and 14a, respectively. As seen in FIG. 2, the walls 13b and 14b of the caps are of equal and uniform thickness throughout.

Still referring to FIG. 2, it can be seen that there is a first bond 15 between the caps 13, 14 and the inner core 11 and a second bond 16 joining the edges or lips 13c and 14c of the caps to each other. The first bond 15 is preferably formed by an adhesive which will form a strong bond between the material of the outer surface of the inner core 11 and the material of the inner surfaces of the cavities 13a, 14a of the caps 13, 14. The adhesive employed for this purpose when the core is of a syntactic form and the caps are of nitrile rubber is a general purpose elastomer bonding agent which has the ability to bond vulcanized elastomers. A suitable adhesive is Chemlok 234B available from the Hughson Chemical Division, Lord Corporation, Erie, Pa. Other adhesives which have the desired properties may also be used.

The second bond 16 which is between the edges or lips 13c and 14c of the caps may be of the same material as the caps or may be a conventional adhesive. When the caps 13 and 14 are of nitrile rubber the bond may also be of nitrile rubber and it can be formed by treating the lip 13c with diluted uncured nitrile rubber before forming the cap 14 in situ. When the cap 13 is of polyurethane the bond 16 is preferably formed by use of an adhesive that will bond castable polyurethane to other materials and polyurethanes. A commercially available product which is suitable for this purpose is a mixture of Thixon 403 and Thixon 404 which is available from the Dayton Coatings and Chemical Division, Whittaker Corporation, West Alexandria, Ohio. Other types of adhesives can also be employed which will form a strong, continuous bond between the lips of vulcanized lower cap and the material of the upper cap which is formed in situ.

In some instances it may be possible by choice of the core material and the cap material to eliminate the use of the adhesive to form the bond 15 between the inner core 11 and the cap 14 or the bond 16 between the lips 13c and 14c. However, in most instances the bonds 15 and 16 formed by the molding of the cap 14 in situ will not be strong enough and an adhesive will be required.

The preferred method of preparing the ball sealers will now be described in connection with FIGS. 3 and 4.

In FIG. 3 can be seen a single cavity of a multiple cavity transfer mold 17 of the type which can be used to mold the caps 13. Mold 17 has a bottom plate 18, a transfer pot and cavity plate 19, having a transfer sprue 20 and a plunger plate 21. To mold the caps 13, the bottom plate 18 and the transfer pot and cavity plate 19 are assembled as shown in FIG. 3 and the thus formed mold cavity charged by introducing uncured elastomer formula through the sprue 20. The mold is then closed by putting the plunger plate 21 in place. It is then pressurized and heated until the elastomer is cured. The exact conditions used to cure the elastomer will, of course, depend upon the specific formula being employed. When the elastomer is an uncured nitrile rubber including sulfur as a curing agent, the pressure preferably will be about 2500 psi and the temperature about 300° F. for about 20 minutes. If castable polyurethane is the elastomer, the resin is preferably heated to about 190° and the hardening agent is heated to about 230° F. and the two are mixed before introduction into mold. The mold temperature is maintained at about 212° F. to effect the cure.

In FIG. 4 is shown a single cavity of a multiple cavity mold 22 which can be used to mold the cap 14 in situ. The mold 22 has a bottom plate 23 having a cap-receiving cavity 24. A cap 13 and an inner core 11 are positioned in the cavity 24 with the core 11 in the cavity 13a of the cap 13. Positioned upon the bottom plate 23 is a transfer pot and cavity plate 25. Plate 25 is aligned with the bottom plate 23 so that the upper half of the core 11 is centrally positioned in a cap-forming cavity 26 of the plate 25. Communicating with the cavity 26 is a transfer spure 27. When the plates 23 and 25 are assembled as seen in FIG. 4, with the cap 13 in the cap-receiving cavity 24 and the inner core 11 properly positioned in cavities 13a and 26, the mold is charged by introducing the uncured elastomer through the sprue 27. The mold is then closed by lowering a plunger plate 28 into position and the elastomer is cured, usually with heat and pressure, to form the cap 14. The bond 15 between the cap 13 and the inner core 11, if not previously formed, and the bond 16 between the lips on edges 13c and 14c are also formed while the ball sealer components are in the mold 22. When the curing process is complete, the mold 22 is opened and the ball sealer 11 removed and trimmed, if necessary.

EXAMPLE 1

A. Molding of Caps

A 49 cavity mold of the type shown in FIG. 3 is charged with seven ounces of the following uncured nitrile rubber formula which upon curing has a durometer of about 50:

| Formula 50NO3 (Molded Dimensions, Inc., Port Washington WI) | |
| --- | --- |
| Ingredient | Parts |
| Nitrile Resin | 100.00 |
| Diphenyl-p-phenylene Diamine | 3.00 |
| Zinc Oxide | 5.00 |
| Stearic Acid | .50 |
| Furnace Coal Black | 65.00 |
| Dioctyl Phthalate | 10.00 |
| Sulfur | 1.50 |
| Flow Agent | 1.50 |
| Benzothiazyl Disulfide | 1.50 |
| Tetraethyl Thiuram Disulfide | .20 |
| Total | 188.20 |

The mold was closed, pressurized at 2,500 pounds per square inch and cured at 300° F. for twenty minutes. The caps were removed from the mold and tumbled lightly to remove flash.

B. Priming the Cores and Caps

Inner cores of syntactic foam were first heated at 350° F. for forty-eight hours, then vapor degreased for three minutes with inhibited trichloroethylene. The caps, which had been prepared as described in paragraph A, were washed in methylethylketone, the lips lightly buffed and then washed again with methylethylketone. The inner cores were primed using a general purpose elastomer bonding agent (Chemlok 234B diluted in xylene) and the lips of the caps only were primed using as the primer the uncured nitrile rubber formula diluted in toluene.

C. Preparation of the Ball Sealers

The caps, prepared and primed as described in paragraph B, were placed in the cap-receiving cavities of the bottom plate of a mold of the type shown in FIG. 4, making sure that the caps were all level to the top of the plate surface. The inner cores, which had beenn primed as described in B, were placed into the caps and the bottom plate of the mold covered with the transfer pot and cavity plate. The mold cavities were then filled through the transfer sprue with additional uncured nitrile rubber. The plunger plate was positioned in place and the mold closed and pressurized at 2500 pounds per square inch at 300° F. for twenty minutes. The mold was then opened and the ball sealers removed, hand trimmed, quality checked and found to be free of cracks and voids. The outer layer was found to be of uniform thickness and securely bound to the inner core.

EXAMPLE 2

The process of Example 1 was repeated using the following uncured nitrile rubber formula which upon curing has a durometer of 70, in place of the nitrile rubber formula of Example 1:

| Formula 70NO25 (Molded Dimensions, Inc., Port Washington WI) | |
|---|---|
| Ingredient | Parts |
| Nitrile Resin | 100.00 |
| Diphenyl-p-phenylene Diamine | 3.00 |
| Zinc Oxide | 5.00 |
| Stearic Acid | .50 |
| Furnace Coal Black | 50.00 |
| Dioctyl Phthalate | 22.00 |
| Sulfur | 1.50 |
| Flow Agent | 1.50 |
| Benzothiazyl Disulfide | 1.50 |
| Tetraethyl Thiuram Disulfide | .20 |
| Total | 185.20 |

The ball sealers obtained were found to be free of cracks and voids and to have a layer of uniform thickness of nitrile rubber securely bound to the inner core.

EXAMPLE 3

A. Molding of Caps

A 49 cavity mold of the type shown in FIG. 3 was treated with a mold release agent and charged with a mixture containing 100 parts of polyurethane resin (Adiprene L-83 available from du Pont Chemical, Wilmington, Del.), 10.3 parts of hardening agent (4,4' methylene-bis-(2-chloroaniline)), and 3 parts of a blue pigment. The mixture was heated to 190° F. prior to introduction into the mold, the mold was closed and the mixture cured at 212° F. The caps were then removed, post cured and washed with methylethylketone.

B. Priming of the Caps and Cores

The lips of the caps were buffed, washed again with methylethylketone and coated with two coats of a two component adhesive system suitable for bonding castable polyurethane compounds (Thixon 403 and Thixon 404). The caps were then permitted to dry. The inner cores of syntactic foam were heated at 350° F. for forty-eight hours and vapor degreased with inhibited trichloroethylene. They were primed with a 50% solution of the previously described adhesive in toluene.

C. Preparation of the Ball Sealers

The caps were put into the cap-receiving cavities of the bottom plate of a mold of the type shown in FIG. 4 with the caps level to the mold. Inner cores were placed in each of the caps and the caps and inner cores were covered with the transfer pot and cavity plate. The mold cavities were then filled via the transfer sprue with the same polyurethane formula used to prepare the caps. The plunger plate was placed in position and the temperature of the mold raised to 212° F. for twenty minutes. Before unloading the mold, the finished parts were rotated in the cavities to remove flash and the balls were preheated to 220° F. to 240° F. Upon cooling the ball sealers were quality checked, found to be free of cracks and voids and to have a uniform thickness of polyurethane securely bound to the inner core.

While for purposes of illustration a specific embodiment of the ball sealer and a method of its preparation have been described, it will be appreciated by those skilled in the art that a number of modifications and changes may be made without departing from the spirit of the scope of the present invention. For example, in place of the transfer molding process described, other molding processes such as injection molding can be used. In addition, other elastomers than those mentioned, including thermoplastic elastomers, and other adhesives may be employed if desired. Therefore, it is to be understood that the scope of the invention is to be limited only by the claims which follow.

We claim:

1. A method of preparing a ball sealer with an inner core and an outer continuous layer of resilient compliant elastomer which method comprises preparing a first hemispheric cap of the elastomer, said cap having a central cavity adapted to receive one half of an inner core, placing an inner core in said cavity and then molding a second hemispheric cap of the same elastomer to the inner core and to the first cap to form an outer continuous layer of elastomer about the inner core.

2. The method of claim 1 in which the elastomer is polyurethane.

3. A method of preparing a ball sealer which has an inner core and an outer continuous layer of resilient, compliant elastomer which comprises preparing a first hemispheric cap having a central cavity adapted to receive one-half of an inner core, placing the cap in a cap receiving cavity of a bottom plate of a mold, coating the outside of an inner core or the inside of the cavity of the cap with an adhesive that will bind the material of the cap to the core, placing the core within the cavity of the cap and positioning a plate having a cap-forming cavity on top of the bottom plate of the mold with the exposed upper half of the inner core received within the cap-forming cavity of the transfer plate, charging the mold with an uncured elastomer formula, and then closing the mold and curing the elastomer to form a second cap in situ which is bound to the inner core and to the first cap.

4. The method of claim 3 in which the elastomer employed is nitrile rubber.

5. The method of claim 3 in which the elastomer employed is polyurethane rubber.

* * * * *